US011433915B2

(12) United States Patent
Fishwick et al.

(10) Patent No.: US 11,433,915 B2
(45) Date of Patent: Sep. 6, 2022

(54) DETERMINING AN ACTION TO BE PERFORMED BY A VEHICLE IN RESPONSE TO CONFLICTING INPUT SIGNALS

(71) Applicant: Toyota Research Institute, Inc., Los Altos, CA (US)

(72) Inventors: Nick Fishwick, San Francisco, CA (US); Wolfram Burgard, Denzlingen (DE)

(73) Assignee: Toyota Research Institute, Inc., Los Altos, CA (US)

( * ) Notice: Subject to any disclaimer, the term of this patent is extended or adjusted under 35 U.S.C. 154(b) by 80 days.

(21) Appl. No.: 17/006,259

(22) Filed: Aug. 28, 2020

(65) Prior Publication Data
US 2022/0063648 A1 Mar. 3, 2022

(51) Int. Cl.
*B60W 50/12* (2012.01)
*B60W 30/09* (2012.01)
(Continued)

(52) U.S. Cl.
CPC ............ *B60W 50/12* (2013.01); *B60W 30/09* (2013.01); *B60W 30/095* (2013.01);
(Continued)

(58) Field of Classification Search
None
See application file for complete search history.

(56) References Cited

U.S. PATENT DOCUMENTS 8,255,121 B2 * 8/2012 Zagorski .............. B60W 50/12
701/45
8,532,901 B2 * 9/2013 Nitz .................... B60W 10/184
340/467

(Continued)

FOREIGN PATENT DOCUMENTS

| CN | 107967819 A | 4/2018 |
| CN | 209492515 U | 10/2019 |
| KR | 20200005153 A | 1/2020 |

OTHER PUBLICATIONS

Tomokazu Suzuki, "Method for Detecting Operation Mistakes with Accelerator Pedal," International Journal of Automotive Engineering, vol. 9, No. 1, pp. 16-22, 2018.

(Continued)

*Primary Examiner* — Jonathan M Dager
(74) *Attorney, Agent, or Firm* — Christopher G. Darrow; Darrow Mustafa PC

(57) ABSTRACT

An action to be performed by a vehicle in response to conflicting input signals can be determined. A sensor signal and an accelerator pedal signal can be received. The sensor signal can indicate a possible need to reduce a speed of the vehicle. The accelerator pedal signal can indicate that an accelerator pedal has been set to a position to increase the speed. An existence of first and second conditions can be determined. The first condition can be that a receipt of the accelerator pedal signal occurred concurrently with a receipt of the sensor signal. The second condition can be that a manner in which the accelerator pedal was set to the position (Continued)

is a better match to a brake pedal usage profile than to an accelerator pedal usage profile. In response to the existence of the first and the second conditions, a brake can be caused to be actuated.

20 Claims, 8 Drawing Sheets

(51) Int. Cl.
*B60W 30/095* (2012.01)
*B60W 40/08* (2012.01)
*B60W 50/06* (2006.01)
*B60W 30/18* (2012.01)
*B60W 50/14* (2020.01)

(52) U.S. Cl.
CPC ...... *B60W 30/18109* (2013.01); *B60W 40/08* (2013.01); *B60W 50/06* (2013.01); *B60W 50/14* (2013.01); *B60W 2540/10* (2013.01); *B60W 2540/12* (2013.01)

(56) References Cited

U.S. PATENT DOCUMENTS

| | | | | |
|---|---|---|---|---|
| 8,942,904 | B2* | 1/2015 | Foerster | G08G 1/16 477/182 |
| 9,796,391 | B2 | 10/2017 | Olsen et al. | |
| 10,054,942 | B2* | 8/2018 | Ichikawa | B60W 50/14 |
| 10,099,688 | B2* | 10/2018 | Taki | B60W 10/20 |
| 10,698,406 | B2* | 6/2020 | Sato | G01C 21/3415 |
| 2012/0296542 | A1* | 11/2012 | Nitz | B60K 31/0008 701/70 |
| 2016/0194000 | A1* | 7/2016 | Taki | B60W 10/20 701/70 |
| 2017/0235305 | A1* | 8/2017 | Jung | G05D 1/021 701/23 |
| 2017/0341612 | A1* | 11/2017 | Ohmori | G08G 1/16 |
| 2018/0029592 | A1* | 2/2018 | Trombley | B60W 10/184 |
| 2018/0284774 | A1* | 10/2018 | Kawamoto | B60W 50/10 |
| 2019/0009775 | A1* | 1/2019 | Ito | B60W 30/085 |
| 2019/0315347 | A1* | 10/2019 | Ike | B60W 30/09 |
| 2020/0156642 | A1* | 5/2020 | Tochigi | B60W 30/18109 |
| 2021/0061268 | A1* | 3/2021 | Ike | B60W 10/18 |
| 2021/0155232 | A1* | 5/2021 | Ike | B60W 10/18 |
| 2021/0237720 | A1* | 8/2021 | Chen | B60W 30/0953 |
| 2021/0323542 | A1* | 10/2021 | Naka | B60W 50/10 |
| 2021/0370923 | A1* | 12/2021 | Cho | G01S 17/931 |
| 2022/0041162 | A1* | 2/2022 | Arita | B60W 30/18027 |

OTHER PUBLICATIONS

Dangra et al., "Automotive User Profiling Using Vehicle Data Considering Different Driving Scenarios," International Journal of Computer Science and Information Technologies, 2014, pp. 7346-7349, vol. 5 (6).

Wang et al., "Learning and Inferring a Driver's Braking Action in Car-Following Scenarios," IEEE Transactions on Vehicular Technology, Jan. 11, 2018, pp. 3887-3899, vol. 67 (5).

Anthony Lim "Toyota to introduce anti-acceleration safety feature," Aug. 20, 2019, 10 pages, found at https://paultan.org/2019/08/20/toyota-to-introduce-anti-acceleration-safety-feature/.

Lestyán et al., "Extracting vehicle sensor signals from CAN logs for driver re-identification," pp. 1-10, Oct. 25, 2019, found at https://arxiv.org/abs/1902.08956.

Chen et al., "SelectFusion: A Generic Framework to Selectively Learn Multisensory Fusion," Journal of Latex Class Files, Dec. 30, 2019, pp. 1-16, vol. 14, No. 8.

Jeff Plungis, "Toyota's New Technology Aims to Put the Brakes on Sudden Acceleration," Consumer Reports, Feb. 3, 2020, pp. 1-3.

Unknown, "Brake Override—Active Safety Features," Brain on Board, pp. 1-3, found at https://brainonboard.ca/safety_features/active_safety_features_brake_override.php.

Unknown, "Toyota's New Acceleration Suppression Function Set to Launch in Summer 2020," Feb. 3, 2020, pp. 1-3, found at https://global.toyota/en/newsroom/corporate/31430982.html.

Wang et al., "Self-Supervised Learning of Depth and Camera Motion from 360° Videos," Computer Science, vol. 11365, Nov. 13, 2018, pp. 53-68, found at: https://arxiv.org/pdf/1811.05304.pdf.

Tak et al., "A Comparison Analysis of Surrogate Safety Measures with Car-Following Perspectives for Advanced Driver Assistance System," Journal of Advanced Transportation, vol. 2018, Article ID 8040815, Nov. 1, 2018, 14 pages.

Shi et al., "Self-Supervised Learning of Depth and Ego-motion with Differentiable Bundle Adjustment," Sep. 28, 2019, pp. 1-10, found at https://arxiv.org/pdf/1909.13163.pdf.

* cited by examiner

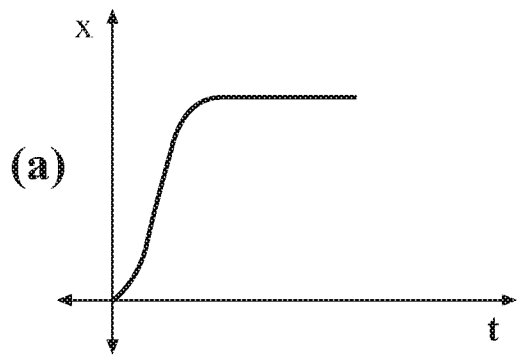
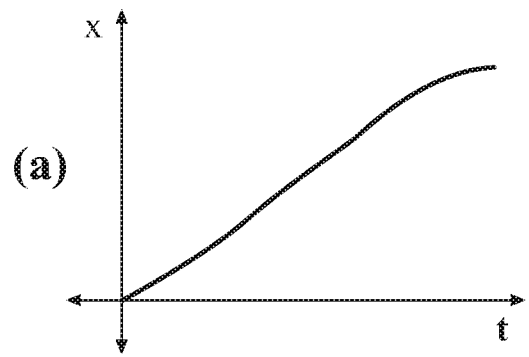
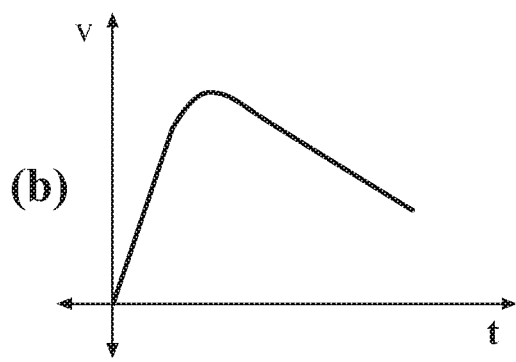
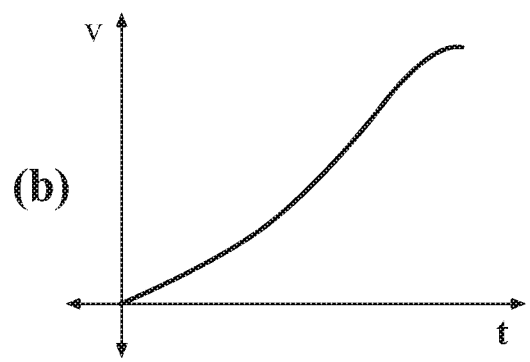
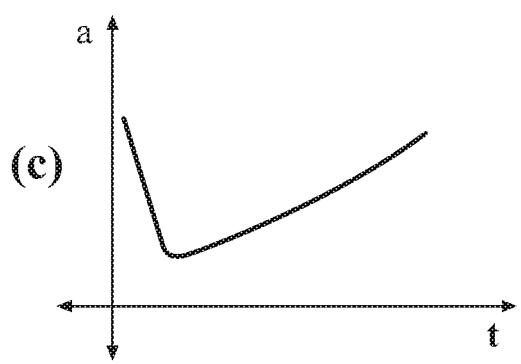
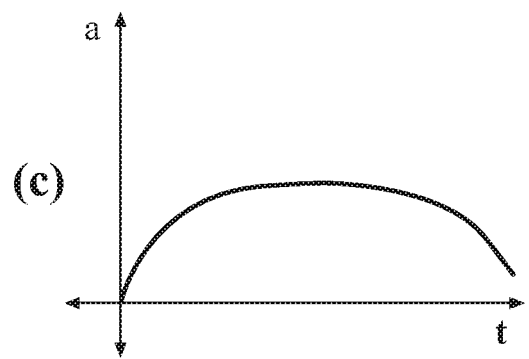
FIG. 3        FIG. 4

DETERMINING AN ACTION TO BE PERFORMED BY A VEHICLE IN RESPONSE TO CONFLICTING INPUT SIGNALS

TECHNICAL FIELD

The disclosed technologies are directed to determining an action to be performed by a vehicle in response to conflicting input signals. Specifically, the disclosed technologies are directed to determining an action to be performed by a vehicle in response to a receipt of a sensor signal, which indicates a possible need to cause a change to a speed of the vehicle, concurrently with a receipt of a pedal signal, which indicates that a pedal has been set to a position to cause an opposite change to the speed of the vehicle.

BACKGROUND

Most automobiles have controls in which an accelerator pedal is positioned to the right of a brake pedal. An operator of such an automobile is usually trained to use his or her right foot to operate each of the accelerator pedal and the brake pedal. In this manner, it is unlikely that both the accelerator pedal and the brake pedal will be operated concurrently and it is likely that an operation of one of the accelerator pedal or the brake pedal will reflect an intent of the operator with respect to a desired change in a speed of the automobile. However, it has been observed that in urgent situations occasionally an operator will apply pressure to an incorrect pedal. For example, in response to a sudden perception of an object in front of and near to the automobile, the application of pressure to the accelerator pedal rather than (or in addition) to the brake pedal would be incorrect. Such a response can result in having the automobile rapidly accelerate toward the object. Fortunately, the automobile can include one or more sensors to perceive such an object. However, in this situation, an input signal associated with a perception of such an object can be in conflict with an input signal associated with the accelerator pedal being in a position to cause the speed of the automobile to increase.

SUMMARY

An action to be performed by a vehicle in response to conflicting input signals can be determined. A sensor signal can be received. The sensor signal can include information that indicates a possible need to cause a speed of the vehicle to be reduced. An acceleration pedal signal can be received. The accelerator pedal signal can include information that indicates that an accelerator pedal has been set to a position to cause the speed of the vehicle to be increased. An existence of a first condition can be determined. The first condition can be that a receipt of the accelerator pedal signal occurred concurrently with a receipt of the sensor signal. An existence of a second condition can be determined. The second condition can be that a manner in which the accelerator pedal was set to the position is a better match to a brake pedal usage profile than to an accelerator pedal usage profile. In response to the existence of the first condition and the existence of the second condition, an actuation of a brake to reduce the speed of the vehicle can be caused.

In a first alternative implementation, in response to the existence of the first condition and the existence of the second condition, an actuation of an additional device disposed on the vehicle can be caused. The actuation of the additional device can provide a communication of a warning signal to an operator of the vehicle, prevent a communication of a signal to a throttle controller that causes the speed of the vehicle to increase, or both.

In a second alternative implementation, the brake pedal usage profile can include a set of brake pedal usage profiles that includes an urgent brake pedal usage profile.

In a third alternative implementation, the brake pedal usage profile can include a set of brake pedal usage profiles, the accelerator pedal usage profile can include a set of accelerator pedal usage profiles, or both. The pedal usage profiles can be associated with different scenarios.

In a fourth alternative implementation, the brake pedal usage profile can include a set of brake pedal usage profiles, the accelerator pedal usage profile can include a set of accelerator pedal usage profiles, or both. The pedal usage profiles can be associated with different operators.

In a fifth alternative implementation, the brake pedal usage profile, the accelerator pedal usage profile, or both can be generated.

In a sixth alternative implementation, the brake pedal usage profile, the accelerator pedal usage profile, or both can be received from a source separate from the vehicle.

In a seventh alternative implementation, a brake pedal signal can be received. The first condition can be that the receipt of the accelerator pedal signal occurred concurrently with the receipt of the sensor signal and a receipt of the brake pedal signal.

In an eighth alternative implementation, a probability of a risk of a collision of the vehicle with another object can be determined. The actuation of the brake can be caused in response to a determination that the probability is high. An actuation of an additional device disposed on the vehicle can be caused in response to a determination that the probability is low.

In a ninth alternative implementation, a specific context of the vehicle can be determined based on one or more of a current location of the vehicle or a current time. A confidence level, associated with the information included in the sensor signal that indicates the possible need to cause the speed of the vehicle to be reduced, can be determined, based on the specific context of the vehicle, to be greater than a threshold value. The actuation of the brake can be caused in response to the confidence level being greater than the threshold value.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3 are graphs of examples of brake pedal usage profiles.

FIG. 4 are graphs of examples of accelerator pedal usage profiles.

DETAILED DESCRIPTION

The disclosed technologies are directed to determining an action to be performed by a vehicle in response to conflicting input signals. A sensor signal can be received. The sensor signal can include information that indicates a possible need to cause a speed of the vehicle to be reduced. For example, the sensor signal can be of a perception of an object that is in front of and near to the vehicle. An acceleration pedal signal can be received. The accelerator pedal signal can include information that indicates that an accelerator pedal has been set to a position to cause the speed of the vehicle to be increased. Thus, the sensor signal and the accelerator pedal signal can be conflicting input signals. An existence of a first condition can be determined. The first condition can be that a receipt of the accelerator pedal signal occurred concurrently with a receipt of the sensor signal. An existence of a second condition can be determined. The second condition can be that a manner in which the accelerator pedal was set to the position is a better match to a brake pedal usage profile than to an accelerator pedal usage profile. For example, the brake pedal usage profile can be of one or more occurrences of an application of pressure to a brake pedal by an operator of the vehicle, while the accelerator pedal usage profile can be of one or more occurrences of an application of pressure to an accelerator pedal by the operator. In response to the existence of the first condition and the existence of the second condition, an actuation of a brake to reduce the speed of the vehicle can be caused. Additionally, an actuation of an additional device disposed on the vehicle can be caused. The actuation of the additional device can provide a communication of a warning signal to the operator of the vehicle, prevent a communication of a signal to a throttle controller that causes the speed of the vehicle to increase, or both.

Figure 1:
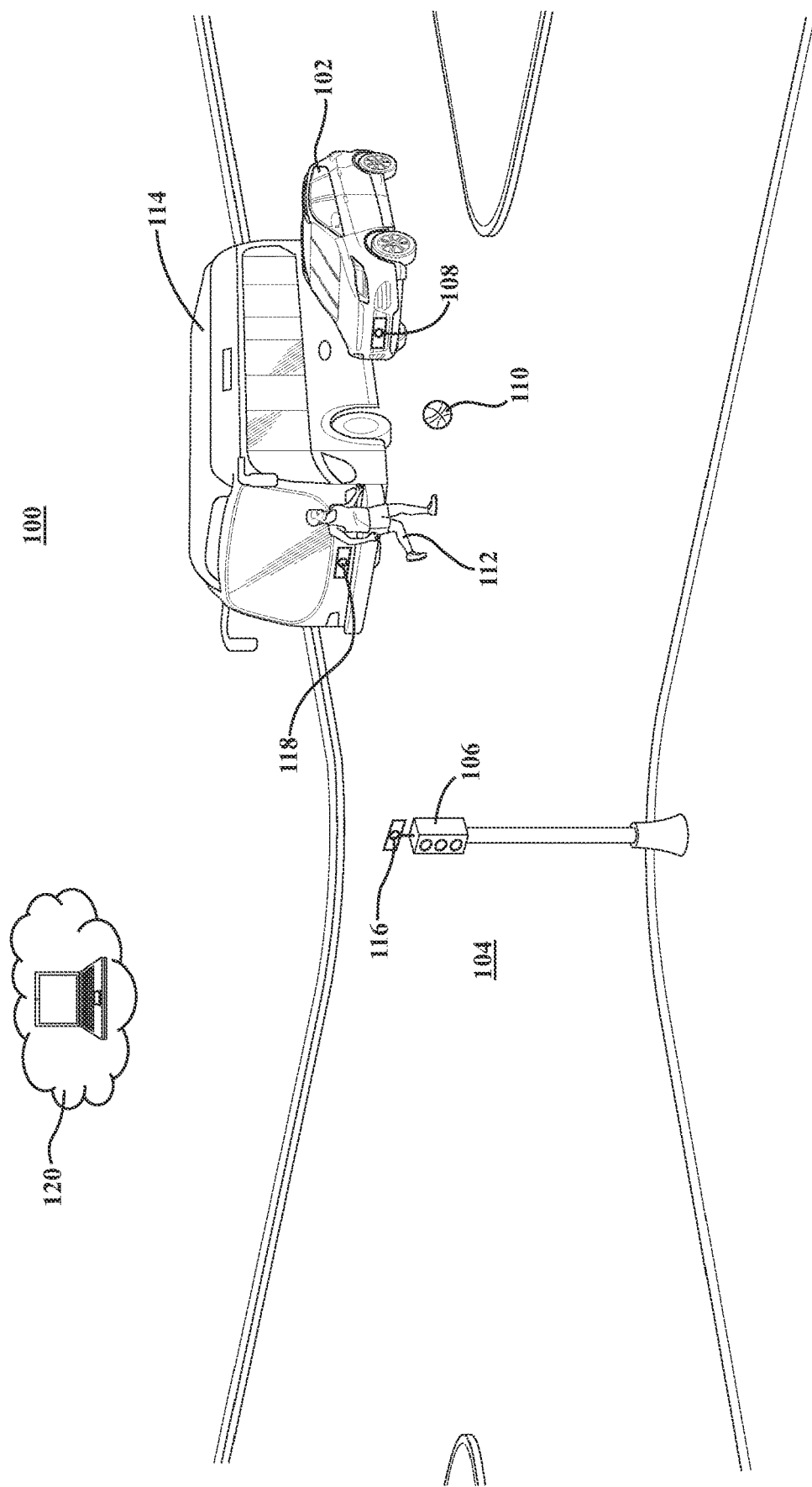
FIG. 1 is a diagram that illustrates an example of an environment for determining an action to be performed by a vehicle in response to conflicting input signals, according to the disclosed technologies.

FIG. 1 is a diagram that illustrates an example of an environment 100 for determining an action to be performed by a vehicle 102 in response to conflicting input signals, according to the disclosed technologies. For example, in the environment 100, the vehicle 102 can be approaching an intersection 104. The intersection 104 can include, for example, a traffic light 106. An operator of the vehicle 102 can be anxious to cross the intersection 104 before a change in a state of the traffic light 106. A first sensor 108 can be disposed, for example, on the vehicle 102. The first sensor 108 can suddenly perceive a first object 110 (e.g., a ball) in front of and near to the vehicle 102. In such a situation, an application of pressure to an accelerator pedal (rather than to or in addition to a brake pedal) would be incorrect. Thus, a sensor input signal, received from the first sensor 108, which indicates a possible need to cause a speed of the vehicle 102 to be reduced, can be in conflict with an accelerator input signal, which indicates that an accelerator pedal has been set to a position to cause the speed of the vehicle 102 to be increased.

Additionally, for example, the environment 100 can include a second object 112 (e.g., a man running after the ball) and a third object 114 (e.g., a bus). The third object 114 can be in a position that precludes perception of the second object 112 by the first sensor 108. However, a second sensor 116 can be disposed, for example, on the traffic light 106. The second sensor 116 can perceive the second object 112. For example, the second sensor 116 can communicate with the vehicle 102 via "Vehicle to Infrastructure" technology. Additionally or alternatively, a third sensor 118 can be disposed, for example, on the third object 114 (e.g., the bus). The third sensor 118 can perceive the second object 112. In this example, the third sensor 118 can communicate with the vehicle 102 via "Vehicle to Vehicle" technology. Additionally, for example, the environment 100 can include a "connected car" cloud platform 120 that can exchange communications with the vehicle 102.

Figure 2:
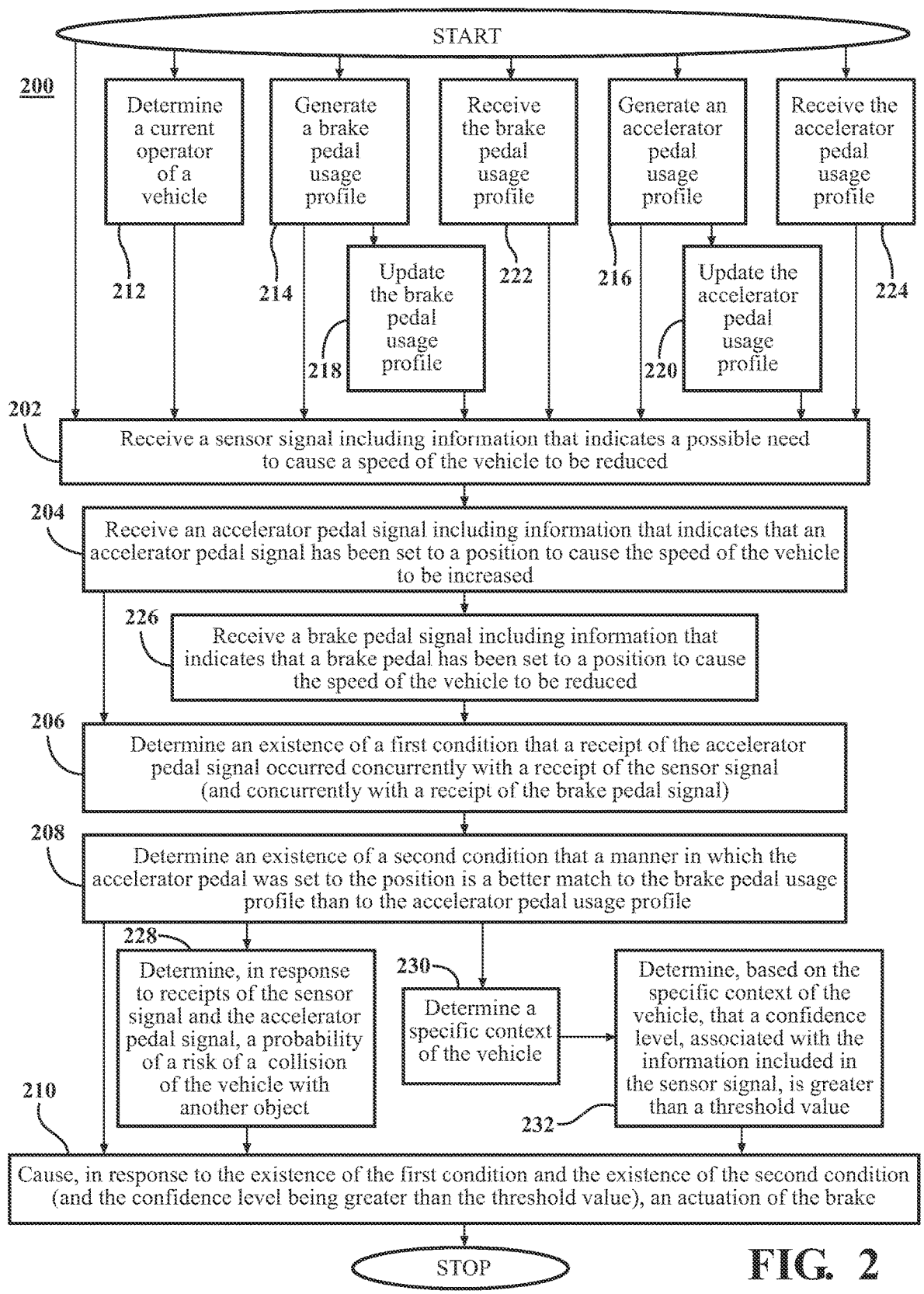
FIG. 2 is a flow diagram that illustrates a first example of a method that is associated with determining the action to be performed by the vehicle in response to the conflicting input signals, according to the disclosed technologies.

FIG. 2 is a flow diagram that illustrates a first example of a method 200 that is associated with determining the action to be performed by the vehicle in response to the conflicting input signals, according to the disclosed technologies.

In the method 200, at an operation 202, a processor can receive a sensor signal. The sensor signal can include information that indicates a possible need to cause a speed of the vehicle to be reduced. For example, the sensor signal can be received from one or more sensors. At least one of the one or more sensors can be disposed on the vehicle. Additionally or alternatively, at least one of the one or more sensors can be disposed on an object separate from the vehicle. At least one of the one or more sensors can be a camera, a radar sensor, a LIDAR sensor, an infrared sensor, an ultrasonic sensor, or the like.

At an operation 204, the processor can receive an accelerator pedal signal. The accelerator pedal signal can include information that indicates that an accelerator pedal has been set to a position to cause the speed of the vehicle to be increased.

At an operation 206, the processor can determine an existence of a first condition. The first condition can be that a receipt of the accelerator pedal signal occurred concurrently with a receipt of the sensor signal. For example, the first condition can exist if the receipt of the accelerator pedal signal occurred within one second of the receipt of the sensor signal.

At an operation 208, the processor can determine an existence of a second condition. The second condition can be that a manner in which the accelerator pedal was set to the position is a better match to a brake pedal usage profile than to an accelerator pedal usage profile. For example, a determination of the existence of the second condition can include a determination of a first correlation, a determination of a second correlation, and a comparison of the first correlation and the second correlation. The first correlation can be between the brake pedal usage profile and the manner in which the accelerator pedal was set to the position. The brake pedal usage profile can be of one or more occurrences of an application of pressure to a brake pedal by an operator of the vehicle. The second correlation can be between the accelerator pedal usage profile and the manner in which the accelerator pedal was set to the position. The accelerator pedal usage profile can be of one or more occurrences of an application of pressure to the accelerator pedal by the operator. If a value of the first correlation is greater than a value of the second correlation, then the manner in which the first pedal was set to the position is a better match to the brake pedal usage profile than to the accelerator pedal usage profile.

The brake pedal usage profile can include one or more of: (1) a graph of position versus time of the one or more occurrences of the application of pressure to the brake pedal, (2) a graph of velocity versus time of the one or more occurrences of the application of pressure to the brake pedal, or (3) a graph of acceleration versus time of the one or more occurrences of the application of pressure to the brake pedal.

FIG. 3 are graphs of examples of brake pedal usage profiles. A view (a) of FIG. 3 is a graph of a brake pedal usage profile as a function of position versus time. A view (b) of FIG. 3 is a graph of a brake pedal usage profile as a function of velocity versus time. A view (c) of FIG. 3 is a graph of a brake pedal usage profile as a function of acceleration versus time.

The accelerator pedal usage profile can include one or more of: (1) a graph of position versus time of the one or more occurrences of the application of pressure to the accelerator pedal, (2) a graph of velocity versus time of the one or more occurrences of the application of pressure to the accelerator pedal, or (3) a graph of acceleration versus time of the one or more occurrences of the application of pressure to the accelerator pedal.

FIG. 4 are graphs of examples of accelerator pedal usage profiles. A view (a) of FIG. 4 is a graph of an accelerator pedal usage profile as a function of position versus time. A view (b) of FIG. 4 is a graph of an accelerator pedal usage profile as a function of velocity versus time. A view (c) of FIG. 4 is a graph of an accelerator pedal usage profile as a function of acceleration versus time.

Returning to FIG. 2, at an operation 210, the processor can cause, in response to the existence of the first condition and the existence of the second condition, an actuation of a brake to reduce the speed of the vehicle.

In a first alternative implementation, at the operation 210, the processor can further cause, in response to the existence of the first condition and the existence of the second condition, an actuation of an additional device disposed on the vehicle. The actuation of the additional device can provide a communication of a warning signal to the operator of the vehicle, prevent a communication of a signal to a throttle controller that causes the speed of the vehicle to increase, or both. For example, the warning signal can include one or more of a visual signal, an audio signal, a haptic signal, or the like.

In a second alternative implementation, the brake pedal usage profile can include a set of brake pedal usage profiles. The set of brake pedal usage profiles can include an urgent brake pedal usage profile. The urgent brake pedal usage profile can be of one or more occurrences of an application of pressure to a brake pedal by an operator of the vehicle in an urgent situation. In the second alternative implementation, the second condition can be that the manner in which the accelerator pedal was set to the position is a better match to the urgent brake pedal usage profile than to the accelerator pedal usage profile.

In a third alternative implementation, the brake pedal usage profile can include a set of brake pedal usage profiles, the accelerator pedal usage profile can include a set of accelerator pedal usage profiles, or both.

The set of brake pedal usage profiles can include, for example, a first brake pedal usage profile and a second brake usage profile. The first brake pedal usage profile can be associated with a first scenario. The second brake pedal usage profile can be associated with a second scenario. For example, the first scenario can be a "normal" scenario and the second scenario can be an "urgent" scenario.

Figure 5:
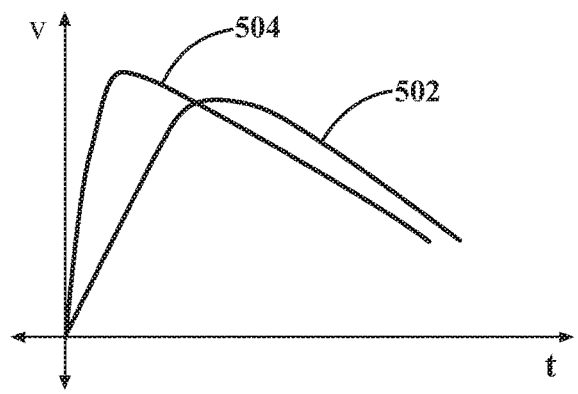
FIG. 5 are graphs of an example of a set of brake pedal usage profiles for different scenarios.

FIG. 5 are graphs of an example of a set of brake pedal usage profiles for different scenarios. The set of brake pedal usage profiles can include, for example, a first brake pedal usage profile 502 for the first scenario (e.g., the "normal" scenario) and a second brake pedal usage profile 504 for the second scenario (e.g., the "urgent" scenario).

The set of accelerator pedal usage profiles can include, for example, a first accelerator pedal usage profile and a second accelerator pedal usage profile. The first accelerator pedal usage profile can be associated with a third scenario. The second accelerator pedal usage profile can be associated with a fourth scenario. For example, the third scenario can be a "normal" scenario and the fourth scenario can be a "running late" scenario.

Figure 6:
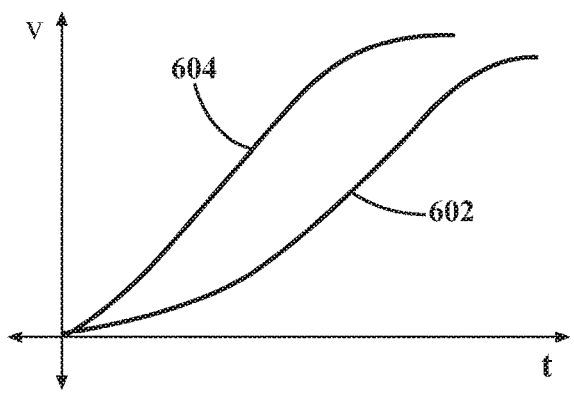
FIG. 6 are graphs of an example of a set of accelerator pedal usage profiles for different scenarios.

FIG. 6 are graphs of an example of a set of accelerator pedal usage profiles for different scenarios. The set of accelerator pedal usage profiles can include, for example, a first accelerator pedal usage profile 602 for the third scenario (e.g., the "normal" scenario) and a second accelerator pedal usage profile 604 for the fourth scenario (e.g., the "running late" scenario). For example, during production of accelerator pedal usage profiles, a distinction may be observed between the occurrences of the application of pressure to the accelerator pedal that start at 8:30 am (e.g., the "normal" scenario) and the occurrences of the application of pressure to the accelerator pedal that start at 8:45 am (e.g., the "running late" scenario).

In the third alternative implementation, the second condition can be that the manner in which the accelerator pedal was set to the position is a better match to a brake pedal usage profile of the set of brake pedal usage profiles than to an accelerator pedal usage profile of the set of accelerator pedal usage profiles.

In a fourth alternative implementation, the brake pedal usage profile can include a set of brake pedal usage profiles, the accelerator pedal usage profile can include a set of accelerator pedal usage profiles, or both.

The set of brake pedal usage profiles can include, for example, a first brake pedal usage profile and a second brake pedal usage profile. The first brake pedal usage profile can be associated with a first operator of the vehicle. The second brake pedal usage profile can be associated with a second operator of the vehicle. For example, the first operator can be Alice and the second operator can be Bob.

Figure 7:
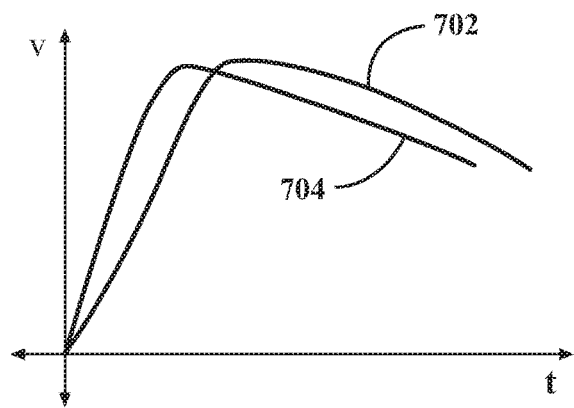
FIG. 7 are graphs of an example of a set of brake pedal usage profiles for different operators.

FIG. 7 are graphs of an example of a set of brake pedal usage profiles for different operators. The set of brake pedal usage profiles can include, for example, a brake pedal usage profile 702 for the first operator (e.g., Alice) and a brake pedal usage profile 704 for the second operator (e.g., Bob).

The set of accelerator pedal usage profiles can include, for example, a first accelerator pedal usage profile and a second accelerator pedal usage profile. The first accelerator pedal usage profile can be associated with the first operator (e.g., Alice). The second accelerator pedal usage profile can be associated with the second operator (e.g., Bob).

Figure 8:
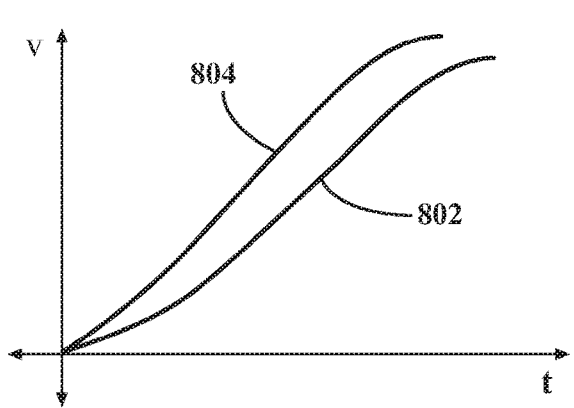
FIG. 8 are graphs of an example of a set of accelerator pedal usage profiles for different operators.

FIG. 8 are graphs of an example of a set of accelerator pedal usage profiles for different operators. The set of accelerator pedal usage profiles can include, for example, an accelerator pedal usage profile 802 for the first operator (e.g., Alice) and an accelerator pedal usage profile 804 for the second operator (e.g., Bob).

Returning to FIG. 2, in the fourth alternative implementation, at an operation 212, the processor can determine that a current operator of the vehicle is the first operator (e.g., Alice). In the fourth alternative implementation, the second condition can be that the manner in which the accelerator pedal was set to the position is a better match to the first brake pedal usage profile (e.g., for Alice) than to the first accelerator pedal usage profile (e.g., for Alice).

In a fifth alternative implementation, at an operation 214, the processor can generate the brake pedal usage profile. Alternatively or additionally, at an operation 216, the processor can generate the accelerator pedal usage profile. In a variation of the fifth alternative implementation, at an operation 218, the processor can update continually the brake pedal usage profile. Alternatively or additionally, at an operation 220, the processor can update continually the accelerator pedal usage profile.

In a sixth alternative implementation, at an operation 222, the processor can receive, from a source separate from the vehicle, the brake pedal usage profile. Alternatively or additionally, at an operation 224, the processor can receive, from the source, the accelerator pedal usage profile. For example, the vehicle can include a biometric system (not illustrated) configured to determine an identity of a current operator of the vehicle. For example, the biometric system can include one or more of a fingerprint scanner embedded in a steering wheel of the vehicle, an iris recognition device incorporated into a rearview mirror of the vehicle, or the like. For example, in response to a determination of the identity of the current operator, the "connected car" cloud platform 120 (illustrated in FIG. 1) can cause an appropriate brake pedal usage profile, an appropriate accelerator pedal usage profile, or both to be communicated to the vehicle. For example, in response to a determination that the identity of the current operator of the vehicle is Alice (i.e., not Bob), the "connected car" cloud platform 120 can cause the appropriate brake pedal usage profile for Alice, the appropriate accelerator pedal usage profile for Alice, or both to be communicated to the vehicle.

In a seventh alternative implementation, at an operation 226, the processor can receive a brake pedal signal. The brake pedal signal can include information that indicates that the brake pedal has been set to a position to cause the speed of the vehicle to be reduced. In the seventh alternative implementation, the first condition can be that the receipt of the accelerator pedal signal occurred concurrently with the receipt of the sensor signal and a receipt of the brake pedal signal.

In an eighth alternative implementation, at an operation 228, the processor can determine, in response to the receipt of the sensor signal and the receipt of the accelerator pedal signal, a probability of a risk of a collision of the vehicle with another object. In the eighth alternative implementation, the operation 210 can include having the processor cause, in response to the existence of the first condition and the existence of the second condition, the actuation of the brake, in response to a determination that the probability is high, or an actuation of an additional device disposed on the vehicle, in response to a determination that the probability is low. For example, the additional device can provide a communication of a warning signal to the operator of the vehicle, prevent the communication of the signal to the throttle controller that causes the speed of the vehicle to increase, or both. For example, the warning signal can include the one or more of the visual signal, the audio signal, the haptic signal, or the like.

In a ninth alternative implementation, at an operation 230, the processor can determine, based on one or more of a current location of the vehicle or a current time, a specific context of the vehicle. At an operation 232, the processor can determine, based on the specific context of the vehicle, that a confidence level, associated with the information included in the sensor signal that indicates the possible need to cause the speed of the vehicle to be reduced, is greater than a threshold value. In the ninth alternative implementation, the operation 210 can include having the processor cause, in response to the existence of the first condition, the existence of the second condition, and the confidence level being greater than the threshold level, the actuation of the brake. With reference to FIG. 1, for example, the vehicle 102 can determine, based on the intersection 104 being in a residential neighborhood and the current time being 10:00 am on a Saturday, that the specific context of the vehicle 102 is one in which several pedestrians are likely to be present. Based on this specific context, the vehicle 102 can determine that the confidence level, that the information about the first object 110 included in the sensor input signal received from the first sensor 108 about a likelihood of the first object 110 being a ball, is 0.9, which is greater than the threshold value of 0.8. In response to the existence of the first condition, the existence of the second condition, and the confidence level being greater than the threshold level, the vehicle 102 can cause its brakes to be actuated.

Figure 9:
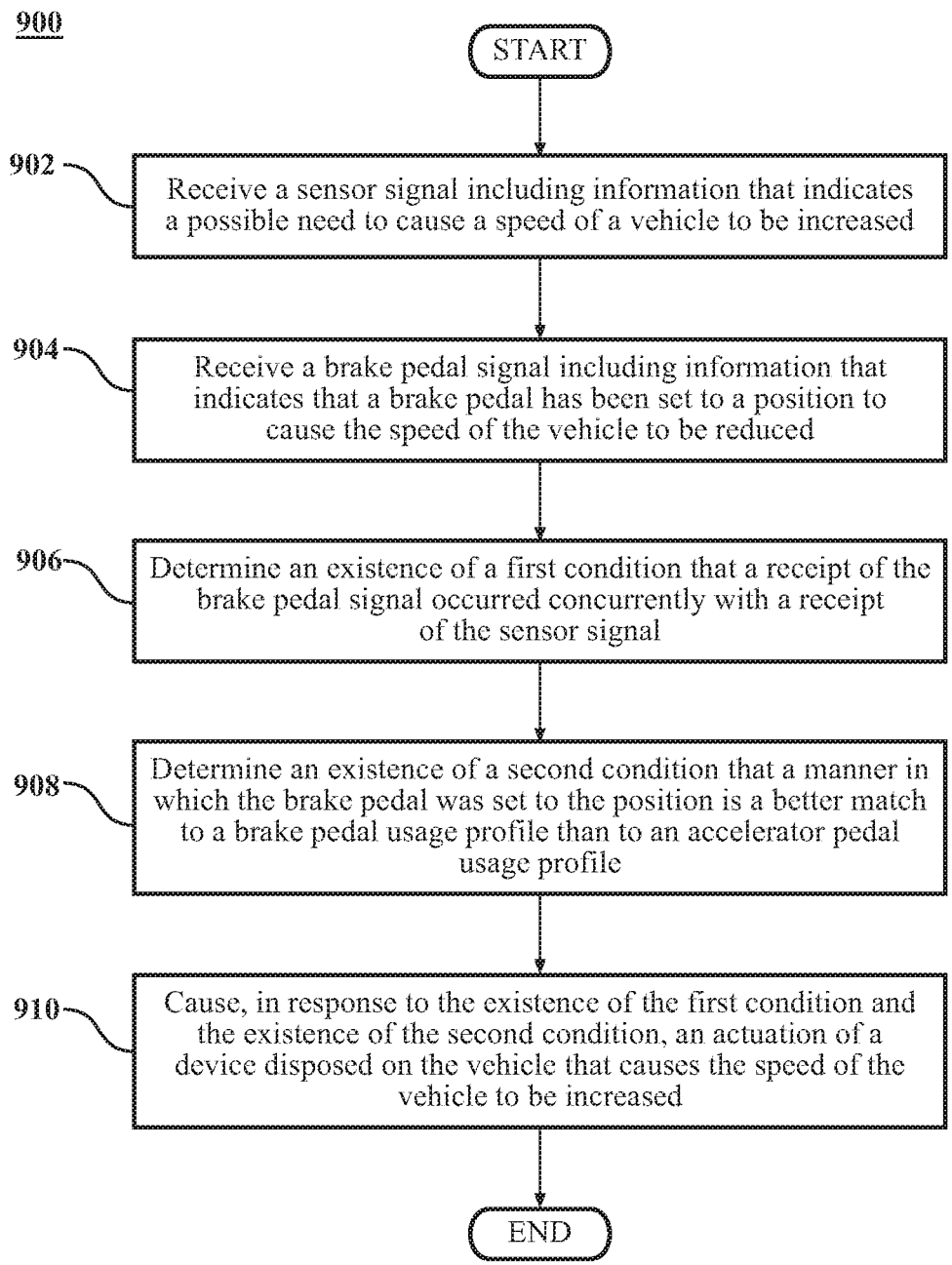
FIG. 9 is a flow diagram that illustrates a second example of a method that is associated with determining the action to be performed by the vehicle in response to the conflicting input signals, according to the disclosed technologies.

While the description above addresses a situation in which an operator of a vehicle incorrectly applies a pressure to an accelerator pedal in a situation in which an intent of the operator was to apply a pressure to a brake pedal, the description below of FIG. 9 is directed to a situation in which the operator incorrectly applies the pressure to the brake pedal in a situation in which such an application of the pressure to the brake pedal was the intent of the operator, but in which a sensor signal includes information that indicates a possible need to cause a speed of the vehicle to be increased, not reduced. For example, if the vehicle is located on an on-ramp to a highway and the sensor signal includes information that indicates that the vehicle can reasonably merge onto the highway, and that another vehicle is rapidly approaching the vehicle from behind on the on-ramp, then such information can indicate a possible need to cause the speed of the vehicle to be increased.

FIG. 9 is a flow diagram that illustrates a second example of a method 900 that is associated with determining the action to be performed by the vehicle in response to the conflicting input signals, according to the disclosed technologies.

In the method 900, at an operation 902, a processor can receive a sensor signal. The sensor signal can include information that indicates a possible need to cause a speed of the vehicle to be increased.

At an operation 904, the processor can receive a brake pedal signal. The brake pedal signal can include information that indicates that a brake pedal has been set to a position to cause the speed of the vehicle to be reduced.

At an operation 906, the processor can determine an existence of a first condition. The first condition can be that a receipt of the brake pedal signal occurred concurrently with a receipt of the sensor signal. For example, the first condition can exist if the receipt of the brake pedal signal occurred within one second of the receipt of the sensor signal.

At an operation 908, the processor can determine an existence of a second condition. The second condition can be that a manner in which the brake pedal was set to the position is a better match to a brake pedal usage profile than to an accelerator pedal usage profile.

At an operation 910, the processor can cause, in response to the existence of the first condition and the existence of the second condition, an actuation of a device disposed on the vehicle that causes the speed of the vehicle to be increased.

Figure 10:
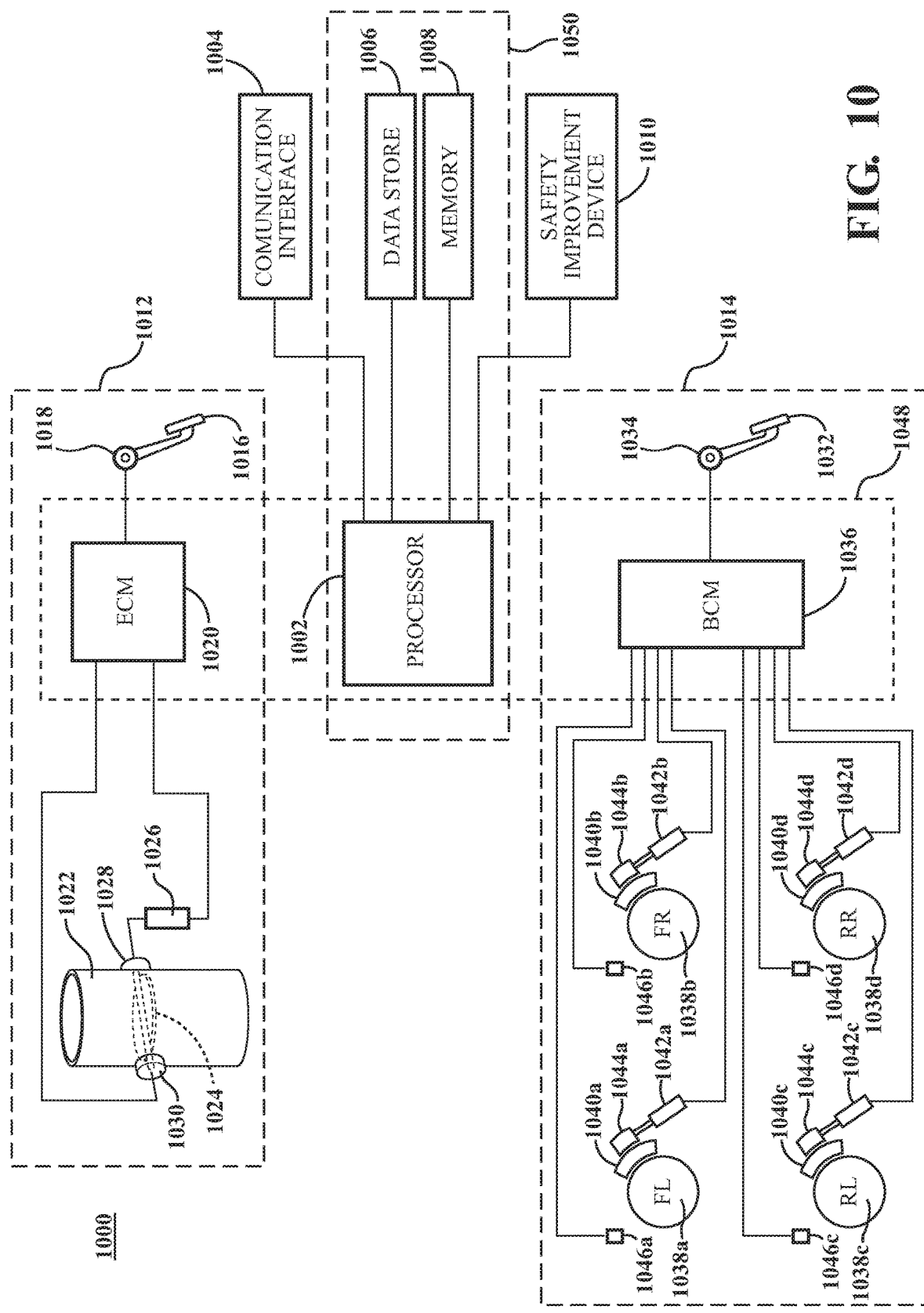
FIG. 10 is a block diagram that illustrates an example of a conflicting input signals resolution system for determining the action to be performed by the vehicle in response to the conflicting input signals, according to the disclosed technologies.

FIG. 10 is a block diagram that illustrates an example of a conflicting input signals resolution system 1000 for determining the action to be performed by the vehicle in response to the conflicting input signals, according to the disclosed technologies. The conflicting input signals resolution system 1000 can be disposed, for example, on the vehicle 102 (illustrated in FIG. 1). The conflicting input signals resolution system 1000 can include, for example, a processor 1002, a communications interface 1004, a data store 1006, a memory 1008, and a safety improvement device 1010. For example, the conflicting input signals resolution system 1000 can include or can be configured to be coupled to a "throttle by wire" system 1012. For example, the conflicting input signals resolution system 1000 can include or can be configured to be coupled to a "brake by wire" system 1014. For example, the conflicting input signals resolution system 1000 can be configured to receive input signals via the communications interface 1004. For example, the conflicting input signals resolution system 1000 can be configured to exchange communications with the "connected car" cloud platform 120 (illustrated in FIG. 1) via the communications interface 1004.

The "throttle by wire" system 1012 can include, for example, an accelerator pedal 1016, an accelerator pedal position sensor 1018, an engine control module (ECM) 1020, a throttle 1022, a butterfly valve 1024, a throttle controller 1026, a throttle actuator 1028, and a throttle position sensor 1030. The accelerator pedal position sensor 1018 can sense a position of the accelerator pedal 1016 and can produce an accelerator pedal position signal that represents the position of the accelerator pedal 1016. The accelerator pedal position signal can be conveyed to the engine control module 1020. The engine control module 1020 can send a throttle control signal to the throttle controller 1026. The throttle controller 1026 can cause the throttle actuator 1028 to set a position of the butterfly valve 1024 to control a speed of the vehicle 102 (illustrated in FIG. 1). The throttle position sensor 1030 can sense the position of the butterfly valve 1024 and can send a throttle feedback signal to the engine control module 1020.

The "brake by wire" system 1014 can include, for example, a brake pedal 1032, a brake pedal position sensor 1034, a brake control module (BCM) 1036, brakes 1038a, 1038b, 1038c, and 1038d, brake calipers 1040a, 1040b, 1040c, and 1040d, brake controllers 1042a, 1042b, 1042c, and 1042d, brake actuators 1044a, 1044b, 1044c, and 1044d, and wheel speed sensors 1046a, 1046b, 1046c, and 1046d. The brake pedal position sensor 1034 can sense a position of the brake pedal 1032 and can produce a brake pedal position sensor signal that represents the position of the brake pedal 1032. The brake pedal position signal can be conveyed to the brake control module 1036. The brake control module 1036 can send brake control signals to brake controllers 1042a, 1042b, 1042c, and 1042d. The brake controllers 1042a, 1042b, 1042c, and 1042d can cause the brake actuators 1044a, 1044b, 1044c, and 1044d to set positions of the brake calipers 1040a, 1040b, 1040c, and 1040d to cause the vehicle 102 (illustrated in FIG. 1) to be braked. The wheel speed sensors 1046a, 1046b, 1046c, and 1046d can sense speeds of wheels and can send brake feedback signals to the brake control module 1036.

Alternatively, the processor 1002, the engine control module 1020, and the brake control module 1036 can be combined in an electronic control unit 1048.

Collectively, the processor 1002, the data store 1006, and the memory 1008 can be a conflicting input signals calculations system 1050.

Figure 11:
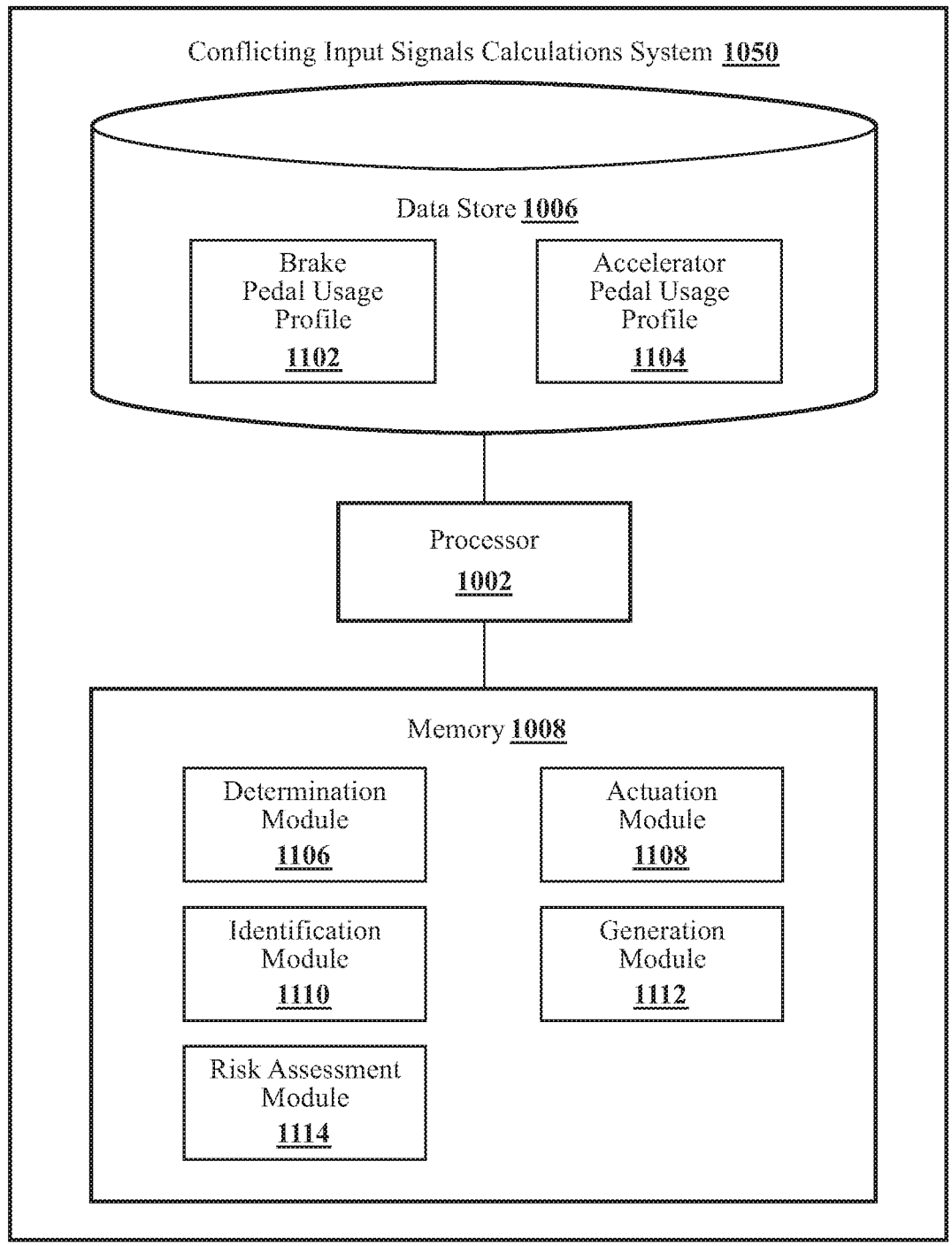
FIG. 11 is a block diagram that illustrates an example of a conflicting input signals calculations system, according to the disclosed technologies.

FIG. 11 is a block diagram that illustrates an example of the conflicting input signals calculations system 1050, according to the disclosed technologies. The conflicting input signals calculations system 1050 can be disposed, for example, on a vehicle. For example, the vehicle can be the vehicle 102 (illustrated in FIG. 1). The processor 1002 can be communicably coupled to the data store 1006 and to the memory 1008.

The processor 1002 can be configured to receive, for example, a sensor signal and an accelerator pedal signal. The sensor signal can include information that indicates a possible need to cause a speed of the vehicle to be reduced. For example, the sensor signal can be received from one or more sensors. At least one of the one or more sensors can be disposed on the vehicle. Additionally or alternatively, at least one of the one or more sensors can be disposed on an object separate from the vehicle. At least one of the one or more sensors can be a camera, a radar sensor, a LIDAR sensor, an infrared sensor, an ultrasonic sensor, or the like. The accelerator pedal signal can include information that indicates that an accelerator pedal has been set to a position to cause the speed of the vehicle to be increased.

The data store 1006 can store, for example, a brake pedal usage profile 1102 and an accelerator pedal usage profile 1104.

The memory 1008 can store, for example, a determination module 1106 and an actuation module 1108.

For example, the determination module 1106 can include instructions that function to control the processor 1002 to determine an existence of a first condition and an existence of a second condition.

The first condition can be that a receipt of the accelerator pedal signal occurred concurrently with a receipt of the sensor signal. For example, the first condition can exist if the receipt of the accelerator pedal signal occurred within one second of the receipt of the sensor signal.

The second condition can be that a manner in which the accelerator pedal was set to the position is a better match to the brake pedal usage profile 1102 than to the accelerator pedal usage profile 1104. For example, a determination of the existence of the second condition can include a determination of a first correlation, a determination of a second correlation, and a comparison of the first correlation and the second correlation. The first correlation can be between the brake pedal usage profile 1102 and the manner in which the accelerator pedal was set to the position. The brake pedal usage profile 1102 can be of one or more occurrences of an application of pressure to a brake pedal by an operator of the vehicle. The second correlation can be between the accelerator pedal usage profile 1104 and the manner in which the accelerator pedal was set to the position. The accelerator pedal usage profile 1104 can be of one or more occurrences of an application of pressure to an accelerator pedal by the operator. If a value of the first correlation is greater than a value of the second correlation, then the manner in which the accelerator pedal was set to the position is a better match to the brake pedal usage profile 1102 than to the accelerator pedal usage profile 1104.

The brake pedal usage profile 1102 can include one or more of: (1) a graph of position versus time of the one or more occurrences of the application of pressure to the brake pedal, (2) a graph of velocity versus time of the one or more occurrences of the application of pressure to the brake pedal, or (3) a graph of acceleration versus time of the one or more occurrences of the application of pressure to the brake pedal.

The accelerator pedal usage profile 1104 can include one or more of: (1) a graph of positon versus time of the one or more occurrences of the application of pressure to the accelerator pedal, (2) a graph of velocity versus time of the one or more occurrences of the application of pressure to the accelerator pedal, or (3) a graph of acceleration versus time of the one or more occurrences of the application of pressure to the accelerator pedal.

For example, the actuation module 1108 can include instructions that function to control the processor 1002 to cause, in response to the existence of the first condition and the existence of the second condition, an actuation of a brake to reduce the speed of the vehicle.

In a first alternative implementation, the actuation module 1108 can include further instructions that function to control the processor 1002 to cause, in response to the existence of the first condition and the existence of the second condition, an actuation of an additional device disposed on the vehicle. The actuation of the additional device can provide a communication of a warning signal to an operator of the vehicle, prevent a communication of a signal to a throttle controller that causes the speed of the vehicle to increase, or both. For example, the warning signal can include one or more of a visual signal, an audio signal, a haptic signal, or the like.

In a second alternative implementation, the brake pedal usage profile 1102 can include a set of brake pedal usage profiles. The set of brake pedal usage profiles can include an urgent brake pedal usage profile. The urgent brake pedal usage profile can be of one or more occurrences of an application of pressure to a brake pedal by the operator of the vehicle in an urgent situation. In the second alternative implementation, the second condition can be that the manner in which the accelerator pedal was set to the position is a better match to the urgent brake pedal usage profile than to the accelerator pedal usage profile 1104.

In a third alternative implementation, the brake pedal usage profile 1102 can include a set of brake pedal usage profiles, the accelerator pedal usage profile 1104 can include a set of accelerator pedal usage profiles, or both.

The set of brake pedal usage profiles can include, for example, a first brake pedal usage profile and a second brake usage profile. The first brake pedal usage profile can be associated with a first scenario. The second brake pedal usage profile can be associated with a second scenario. For example, the first scenario can be a "normal" scenario and the second scenario can be an "urgent" scenario.

The set of accelerator pedal usage profiles can include, for example, a first accelerator pedal usage profile and a second accelerator usage profile. The first accelerator pedal usage profile can be associated with a third scenario. The second accelerator pedal usage profile can be associated with a fourth scenario. For example, the third scenario can be a "normal" scenario and the fourth scenario can be a "running late" scenario. For example, during production of accelerator pedal usage profiles, a distinction may be observed between the occurrences of the application of pressure to the accelerator pedal that start at 8:30 am (e.g., the "normal" scenario) and the occurrences of the application of pressure to the accelerator pedal that start at 8:45 am (e.g., the "running late" scenario).

In the third alternative implementation, the second condition can be that the manner in which the accelerator pedal was set to the position is a better match to a brake pedal usage profile of the set of brake pedal usage profiles than to an accelerator pedal usage profile of the set of accelerator pedal usage profiles.

In a fourth alternative implementation, the brake pedal usage profile 1102 can include a set of brake pedal usage profiles, the accelerator pedal usage profile 1104 can include a set of accelerator pedal usage profiles, or both.

The set of brake pedal usage profiles can include, for example, a first brake pedal usage profile and a second brake pedal usage profile. The first brake pedal usage profile can be associated with a first operator of the vehicle. The second brake pedal usage profile can be associated with a second operator of the vehicle.

The set of accelerator pedal usage profiles can include, for example, a first accelerator pedal usage profile and a second accelerator pedal usage profile. The first accelerator pedal usage profile can be associated with the first operator. The second accelerator pedal usage profile can be associated with the second operator.

In the fourth alternative implementation, the memory 1008 can store an identification module 1110. For example, the identification module 1110 can include instructions that function to control the processor 1002 to determine that a current operator of the vehicle is the first operator. In the fourth alternative implementation, the second condition can be that the manner in which the accelerator pedal was set to the position is a better match to the first brake pedal usage profile than to the first accelerator pedal usage profile.

In a fifth alternative implementation, the memory 1008 can store a generation module 1112. For example, the generation module 1112 can include instructions that function to control the processor 1002 to generate the brake pedal usage profile 1102, the accelerator pedal usage profile 1104, or both. In a variation of the fifth alternative implementation, the generation module 1112 can include further instructions that function to control the processor 1002 to update continually the brake pedal usage profile 1102, the accelerator pedal usage profile 1104, or both.

In a sixth alternative implementation, the processor 1002 can be configured to receive, from a source separate from the vehicle, the brake pedal usage profile 1102, the accelerator pedal usage profile 1104, or both. For example, the vehicle can include a biometric system (not illustrated) configured to determine an identity of a current operator of the vehicle. For example, the biometric system can include one or more of a fingerprint scanner embedded in a steering wheel of the vehicle, an iris recognition device incorporated into a rearview mirror of the vehicle, or the like. For example, in response to a determination of the identity of the current operator of the vehicle, the "connected car" cloud platform 120 (illustrated in FIG. 1) can cause an appropriate brake pedal usage profile, an appropriate accelerator pedal usage profile, or both to be communicated to the processor 1002.

In a seventh alternative implementation, the processor 1002 can receive a brake pedal signal. The brake pedal signal can include information that indicates that the brake pedal has been set to a position to cause the speed of the vehicle to be reduced. In the seventh alternative implementation, the first condition can be that the receipt of the accelerator pedal signal occurred concurrently with the receipt of the sensor signal and a receipt of the brake pedal signal.

In an eighth alternative implementation, the memory 1008 can store a risk assessment module 1114. For example, the risk assessment module 1114 can include instructions that function to control the processor 1002 to determine, in response to the receipt of the sensor signal and the receipt of the accelerator pedal signal, a probability of a risk of a collision of the vehicle with another object. In the eighth alternative implementation, for example, the actuation module 1108 can include instructions that function to control the processor 1002 to cause, in response to the existence of the first condition and the existence of the second condition, the actuation of the brake, in response to a determination that the probability is high, or an actuation of an additional device disposed on the vehicle, in response to a determination that the probability is low. For example, the additional device can provide a communication of a warning signal to the operator of the vehicle, prevent the communication of the signal to the throttle controller that causes the speed of the vehicle to increase, or both. For example, the warning signal can include the one or more of the visual signal, the audio signal, the haptic signal, or the like.

In a ninth alternative implementation, the determination module 1106 can include further instructions that function to control the processor 1002 to determine, based on at least one of a current location of the vehicle or a current time, a specific context of the vehicle. The determination module 1106 can include further instructions that function to control the processor 1002 to determine, based on the specific context of the vehicle, that a confidence level, associated with the information included in the sensor signal that indicates the possible need to cause the speed of the vehicle to be reduced, is greater than a threshold value. The actuation module 1108 can include instructions that function to control the processor 1002 to cause, in response to the existence of the first condition, the existence of the second condition, and the confidence level being greater than the threshold level, the actuation of the brake.

Alternatively, the processor 1002 can be configured to receive, for example, the sensor signal and a brake pedal signal. The sensor signal can include information that indicates a possible need to cause a speed of the vehicle to be increased. The brake pedal signal can include information that indicates that the brake pedal has been set to a position to cause the speed of the vehicle to be reduced. The data store 1006 can store, for example, the brake pedal usage profile 1102 and the accelerator pedal usage profile 1104. The memory 1008 can store, for example, the determination module 1106 and the actuation module 1108. For example, the determination module 1106 can include instructions that function to control the processor 1002 to determine an existence of a first condition and an existence of the second condition. The first condition can be that a receipt of the brake pedal signal occurred concurrently with a receipt of the sensor signal. For example, the first condition can exist if the receipt of the brake pedal signal occurred within one second of the receipt of the sensor signal. The second condition can be that a manner in which the brake pedal was set to the position is a better match to the brake pedal usage profile 1102 than to the accelerator pedal usage profile 1104. For example, the actuation module 1108 can include instructions that function to control the processor 1002 to cause, in response to the existence of the first condition and the existence of the second condition, an actuation of a device disposed on the vehicle that causes the speed of the vehicle to be increased.

Although the methods 200 and 900 described above are from the perspective of a general processor, one of skill in the art understands, in light of the description herein, that the method 200, the method 900, or both can be implemented by the conflicting input signals calculations system 1050 illustrated in FIGS. 10 and 11. However, neither the method 200 nor the method 900 is limited to being implemented within the conflicting input signals calculations system 1050. Rather, the conflicting input signals calculations system 1050 is one example of a system that may implement the method 200, the method 900, or both. Additionally, although the methods 200 and 900 are illustrated as generally serial processes, various aspects of the method 200 or the method 900 may be able to be executed in parallel to perform the described functions.

Figure 12:
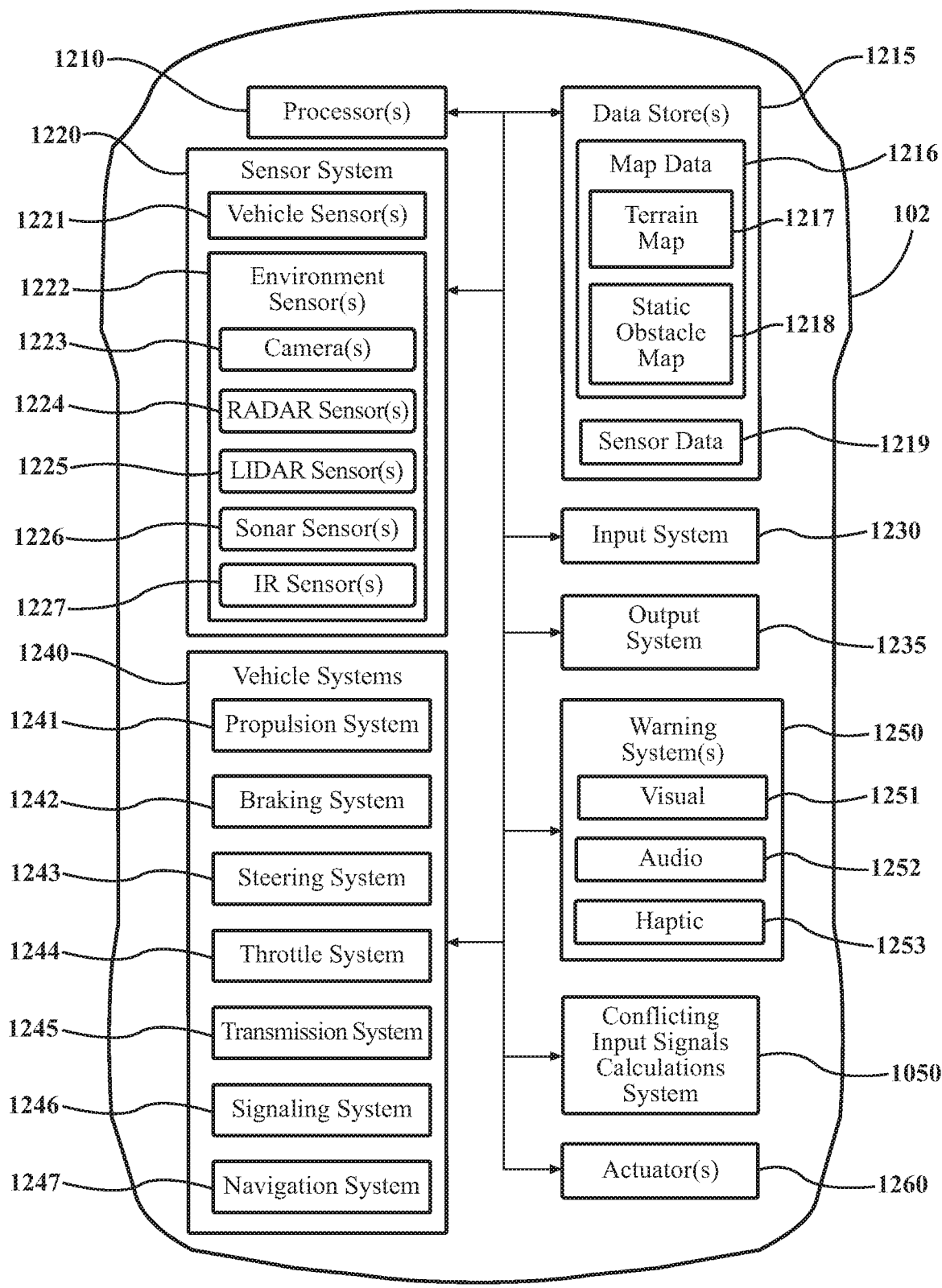
FIG. 12 is a block diagram that illustrates an example of elements disposed on the vehicle, according to the disclosed technologies.

FIG. 12 is a block diagram that illustrates an example of elements disposed on the vehicle 102, according to the disclosed technologies. As used herein, a "vehicle" can be any form of powered transport. In one or more implementations, the vehicle 102 can be an automobile. While arrangements described herein are with respect to automobiles, one of skill in the art understands, in light of the description herein, that embodiments are not limited to automobiles.

The vehicle 102 can include various elements. The vehicle 102 can have any combination of the various elements illustrated in FIG. 12. In various embodiments, it may not be necessary for the vehicle 102 to include all of the elements illustrated in FIG. 12. Furthermore, the vehicle 102 can have elements in addition to those illustrated in FIG. 12. While the various elements are illustrated in FIG. 12 as being located within the vehicle 102, one or more of these elements can be located external to the vehicle 102. Furthermore, the elements illustrated may be physically separated by large distances. For example, the elements can include one or more processors 1210, one or more data stores 1215, a sensor system 1220, an input system 1230, an output system 1235, vehicle systems 1240, one or more warning systems 1250, one or more actuators 1260, and the conflicting input signals calculations system 250.

In one or more arrangements, the one or more processors 1210 can be a main processor of the vehicle 102. For example, functions and/or operations of one or more of the processor 1002 (illustrated in FIGS. 10 and 11), the engine control module 1020 (illustrated in FIG. 10), the brake control module 1036 (illustrated in FIG. 10), or the electronic control unit 1048 (illustrated in FIG. 10) can be realized by the one or more processors 1210.

The one or more data stores 1215 can store, for example, one or more types of data. For example, functions and/or operations of the data store 1006 (illustrated in FIGS. 10 and 11) can be realized by the one or more data stores 1215. The one or more data store 1215 can include volatile memory and/or non-volatile memory. Examples of suitable memory for the one or more data stores 1215 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 1215 can be a component of the one or more processors 1210. Additionally or alternatively, the one or more data stores 1215 can be operatively connected to the one or more processors 1210 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 1215 can store map data 1216. The map data 1216 can include maps of one or more geographic areas. In some instances, the map data 1216 can include information or data on roads, traffic control devices, road markings, structures, features, and/or landmarks in the one or more geographic areas. The map data 1216 can be in any suitable form. In some instances, the map data 1216 can include aerial views of an area. In some instances, the map data 1216 can include ground views of an area, including 360-degree ground views. The map data 1216 can include measurements, dimensions, distances, and/or information for one or more items included in the map data 1216 and/or relative to other items included in the map data 1216. The map data 1216 can include a digital map with information about road geometry. The map data 1216 can be high quality and/or highly detailed.

In one or more arrangements, the map data 1216 can include one or more terrain maps 1217. The one or more terrain maps 1217 can include information about the ground, terrain, roads, surfaces, and/or other features of one or more geographic areas. The one or more terrain maps 1217 can include elevation data of the one or more geographic areas. The map data 1216 can be high quality and/or highly detailed. The one or more terrain maps 1217 can define one or more ground surfaces, which can include paved roads, unpaved roads, land, and other things that define a ground surface.

In one or more arrangements, the map data 1216 can include one or more static obstacle maps 1218. The one or more static obstacle maps 1218 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 1218 can have location data, size data, dimension data, material data, and/or other data associated with them. The one or more static obstacle maps 1218 can include measurements, dimensions, distances, and/or information for one or more static obstacles. The one or more static obstacle maps 1218 can be high quality and/or highly detailed. The one or more static obstacle maps 1218 can be updated to reflect changes within a mapped area.

In one or more arrangements, the one or more data stores 1215 can store sensor data 1219. As used herein, "sensor data" can mean any information about the sensors with which the vehicle 102 can be equipped including the capabilities of and other information about such sensors. The sensor data 1219 can relate to one or more sensors of the sensor system 1220. For example, in one or more arrangements, the sensor data 1219 can include information about one or more LIDAR sensors 1225 of the sensor system 1220.

In some arrangements, at least a portion of the map data 1216 and/or the sensor data 1219 can be located in one or more data stores 1215 that are located onboard the vehicle 102. Alternatively or additionally, at least a portion of the map data 1216 and/or the sensor data 1219 can be located in one or more data stores 1215 that are located remotely from the vehicle 102.

The sensor system 1220 can include one or more sensors. As used herein, a "sensor" can mean any device, component, and/or system that can detect and/or sense something. The one or more sensors can be configured to detect and/or sense in real-time. As used herein, the term "real-time" can mean a level of processing responsiveness that is perceived by a user or system to be sufficiently immediate for a particular process or determination to be made, or that enables the processor to keep pace with some external process.

In arrangements in which the sensor system 1220 includes a plurality of sensors, the sensors can work independently from each other. Alternatively, two or more of the sensors can work in combination with each other. In such a case, the two or more sensors can form a sensor network. The sensor system 1220 and/or the one or more sensors can be operatively connected to the one or more processors 1210, the one or more data stores 1215, and/or another element of the vehicle 102 (including any of the elements illustrated in FIG. 12). The sensor system 1220 can acquire data of at least a portion of the external environment of the vehicle 102 (e.g., nearby vehicles). The sensor system 1220 can include any suitable type of sensor. Various examples of different types of sensors are described herein. However, one of skill in the art understands that the embodiments are not limited to the particular sensors described herein.

The sensor system 1220 can include one or more vehicle sensors 1221. The one or more vehicle sensors 1221 can detect, determine, and/or sense information about the vehicle 102 itself. In one or more arrangements, the one or more vehicle sensors 1221 can be configured to detect and/or sense position and orientation changes of the vehicle 102 such as, for example, based on inertial acceleration. In one or more arrangements, the one or more vehicle sensors 1221 can include one or more accelerometers, one or more gyroscopes, an inertial measurement unit (IMU), a dead-reckoning system, a global navigation satellite system (GNSS), a global positioning system (GPS), a navigation system 1247, and/or other suitable sensors. The one or more vehicle sensors 1221 can be configured to detect and/or sense one or more characteristics of the vehicle 102. In one or more arrangements, the one or more vehicle sensors 1221 can include a speedometer to determine a current speed of the vehicle 102.

Alternatively or additionally, the sensor system 1220 can include one or more environment sensors 1222 configured to acquire and/or sense driving environment data. As used herein, "driving environment data" can include data or information about the external environment in which a vehicle is located or one or more portions thereof. For example, the one or more environment sensors 1222 can be configured to detect, quantify, and/or sense obstacles in at least a portion of the external environment of the vehicle 102 and/or information/data about such obstacles. Such obstacles may be stationary objects and/or dynamic objects. The one or more environment sensors 1222 can be configured to detect, measure, quantify, and/or sense other things in the external environment of the vehicle 102 such as, for example, lane markers, signs, traffic lights, traffic signs, lane lines, crosswalks, curbs proximate the vehicle 102, off-road objects, etc.

Various examples of sensors of the sensor system 1220 are described herein. The example sensors may be part of the one or more vehicle sensors 1221 and/or the one or more environment sensors 1222. However, one of skill in the art understands that the embodiments are not limited to the particular sensors described.

In one or more arrangement, the one or more environment sensors 1222 can include one more cameras 1223 (e.g., one or more high dynamic range (HDR) cameras), one or more radar sensors 1224, one or more LIDAR sensors 1225, one or more sonar sensors 1226, and/or one or more infrared (IR) sensors 1227.

The input system 1230 can include any device, component, system, element, arrangement, or groups thereof that enable information/data to be entered into a machine. The input system 1230 can receive an input from a vehicle passenger (e.g., a driver or a passenger). The output system 1235 can include any device, component, system, element, arrangement, or groups thereof that enable information/data to be presented to a vehicle passenger (e.g., a driver or a passenger). For example, functions and/or operations of the communications interface 1004 (illustrated in FIG. 10) can be realized by the input system 1230, the output system 1235, or both.

Various examples of the one or more vehicle systems 1240 are illustrated in FIG. 12. However, one of skill in the art understands that the vehicle 102 can include more, fewer, or different vehicle systems. Although particular vehicle systems can be separately defined, each or any of the systems or portions thereof may be otherwise combined or segregated via hardware and/or software within the vehicle 102. For example, the one or more vehicle systems 1240 can include a propulsion system 1241, a braking system 1242, a steering system 1243, a throttle system 1244, a transmission system 1245, a signaling system 1246, and/or the navigation system 1247. Each of these systems can include one or more devices, components, and/or a combination thereof, now known or later developed. For example, functions and/or operations of the "throttle by wire" system 1012 (illustrated in FIG. 10) can be realized by the throttle system 1244. For example, functions and/or operations of the "brake by wire" system 1014 (illustrated in FIG. 10) can be realized by the braking system 1242.

The navigation system 1247 can include one or more devices, applications, and/or combinations thereof, now known or later developed, configured to determine the geographic location of the vehicle 102 and/or to determine a travel route for the vehicle 102. The navigation system 1247 can include one or more mapping applications to determine a travel route for the vehicle 102. The navigation system 1247 can include a global positioning system, a local positioning system, a geolocation system, and/or a combination thereof.

The one or more warning systems 1250 can include one or more devices that can provide a communication of a warning signal to an operator of the vehicle 102. Examples of the one or more devices can include a warning light to provide a visual signal 1251, a speaker to provide an audio signal 1252, and/or a haptic device to provide a haptic signal 1253 (e.g., a physical force or vibration) to the operator. For example, the haptic device can cause a vibration in a seat of the operator, in the steering wheel, etc.

The one or more actuators 1260 can be any element or combination of elements operable to modify, adjust, and/or alter one or more of the vehicle systems 1240 or components thereof responsive to receiving signals or other inputs from the one or more processors 1210. Any suitable actuator can be used. For example, the one or more actuators 1260 can include motors, pneumatic actuators, hydraulic pistons, relays, solenoids, and/or piezoelectric actuators.

The one or more processors 1210 and the conflicting input signals calculations system 250 can be operatively connected to communicate with the various vehicle systems 1240 and/or individual components thereof. For example, the one or more processors 1210 and the conflicting input signals calculations system 250 may control some or all of these vehicle systems 1240. For example, the one or more processors 1210 and the conflicting input signals calculations system 250 may be in communication to send and/or receive information from the various vehicle systems 1240 to control the movement, speed, maneuvering, heading, direction, etc. of the vehicle 102.

The vehicle 102 can include one or more modules, at least some of which are described herein. The modules can be implemented as computer-readable program code that, when executed by the one or more processors 1210, implement one or more of the various processes described herein. One or more of the modules can be a component of the one or more processors 1210. Alternatively or additionally, one or more of the modules can be executed on and/or distributed among other processing systems to which the one or more processors 1210 can be operatively connected. The modules can include instructions (e.g., program logic) executable by the one or more processors 1210. Alternatively or additionally, the one or more data store 1215 may contain such instructions.

In one or more arrangements, the one or more of the modules described herein can include artificial or computational intelligence elements, e.g., a neural network, fuzzy logic, or other machine learning algorithms. Furthermore, in one or more arrangements, the one or more of the modules can be distributed among a plurality of the modules described herein. In one or more arrangements, two or more of the modules described herein can be combined into a single module.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1, 2, and 9-12, but the embodiments are not limited to the illustrated structure or application.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a RAM, a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for determining when a vehicle should brake even though a driver is activating an accelerator, the method comprising:
   receiving a sensor signal that indicates a possible need to cause a speed of the vehicle to be reduced;
   receiving an accelerator pedal signal that indicates that an accelerator pedal has been set to a position to cause the speed of the vehicle to be increased;
   determining if the sensor signal and the accelerator pedal signal are received concurrently;
   determining if a manner in which the accelerator pedal was set to the position is a better match to a brake pedal usage profile than to an accelerator pedal usage profile; and
   if the sensor signal and the accelerator pedal signal were received concurrently, and if the brake pedal usage profile is the better match, actuating a vehicle brake to reduce the speed of the vehicle.

2. A method for determining an action to be performed by a vehicle in response to conflicting input signals, the method comprising:
   receiving a sensor signal, the sensor signal including information that indicates a possible need to cause a speed of the vehicle to be reduced;
   receiving an accelerator pedal signal, the accelerator pedal signal including information that indicates that an accelerator pedal has been set to a position to cause the speed of the vehicle to be increased;
   determining an existence of a first condition, the first condition being that a receipt of the accelerator pedal signal occurred concurrently with a receipt of the sensor signal;

determining an existence of a second condition, the second condition being that a manner in which the accelerator pedal was set to the position is a better match to a brake pedal usage profile than to an accelerator pedal usage profile; and causing, in response to the existence of the first condition and the existence of the second condition, an actuation of a brake to reduce the speed of the vehicle.

3. The method of claim 2, further comprising receiving a brake pedal signal, the brake pedal signal including information that indicates that a brake pedal has been set to a position to cause the speed of the vehicle to be reduced, wherein the first condition is that the receipt of the accelerator pedal signal occurred concurrently with the receipt of the sensor signal and a receipt of the brake pedal signal.

4. The method of claim 2, further comprising determining, in response to the receipt of the sensor signal and the receipt of the accelerator pedal signal, a probability of a risk of a collision of the vehicle with another object, wherein:
the causing the actuation comprises:
causing the actuation of the brake, in response to a determination that the probability is high, or
causing an actuation of an additional device disposed on the vehicle, in response to a determination that the probability is low.

5. The method of claim 2, further comprising:
determining, based on at least one of a current location of the vehicle or a current time, a specific context of the vehicle; and
determining, based on the specific context of the vehicle, that a confidence level, associated with the information included in the sensor signal that indicates the possible need to cause the speed of the vehicle to be reduced, is greater than a threshold value,
wherein the causing the actuation comprises, causing, in response to the confidence level being greater than the threshold value, the actuation of the brake.

6. A system for determining an action to be performed by a vehicle in response to conflicting input signals, the system comprising:
one or more processors configured to receive a sensor signal and an accelerator pedal signal, the sensor signal including information that indicates a possible need to cause a speed of the vehicle to be reduced, the accelerator pedal signal including information that indicates that an accelerator pedal has been set to a position to cause the speed of the vehicle to be increased; and
a memory communicably coupled to the one or more processors and storing:
a determination module including instructions that when executed by the one or more processors cause the one or more processors to:
determine an existence of a first condition, the first condition being that a receipt of the accelerator pedal signal occurred concurrently with a receipt of the sensor signal; and
determine an existence of a second condition, the second condition being that a manner in which the accelerator pedal was set to the position is a better match to a brake pedal usage profile than to an accelerator pedal usage profile; and
an actuation module including instructions that when executed by the one or more processors cause the one or more processors to cause, in response to the existence of the first condition and the existence of the second condition, an actuation of a brake to reduce the speed of the vehicle.

7. The system of claim 6, wherein:
the one or more processors are further configured to receive a brake pedal signal, the brake pedal signal including information that indicates that a brake pedal has been set to a position to cause the speed of the vehicle to be reduced; and
the first condition is that the receipt of the accelerator pedal signal occurred concurrently with the receipt of the sensor signal and a receipt of the brake pedal signal.

8. The system of claim 6, wherein a determination of the existence of the second condition comprises:
a determination of a first correlation, the first correlation being between the brake pedal usage profile and the manner in which the accelerator pedal was set to the position, the brake pedal usage profile being of at least one occurrence of an application of pressure to a brake pedal by an operator of the vehicle;
a determination of a second correlation, the second correlation being between the accelerator pedal usage profile and the manner in which the accelerator pedal was set to the position, the accelerator pedal usage profile being of at least one occurrence of an application of pressure to the accelerator pedal by the operator; and
a comparison of the first correlation and the second correlation.

9. The system of claim 6, wherein at least one of:
the brake pedal usage profile comprises at least one of:
a graph of position versus time of at least one occurrence of an application of pressure to a brake pedal by an operator of the vehicle,
a graph of velocity versus time of the at least one occurrence of the application of pressure to the brake pedal by the operator, or
a graph of acceleration versus time of the at least one occurrence of the application of pressure to the brake pedal by the operator, or
the accelerator pedal usage profile comprises at least one of:
a graph of position versus time of at least one occurrence of an application of pressure to an accelerator pedal by the operator,
a graph of velocity versus time of the at least one occurrence of the application of pressure to the accelerator pedal by the operator, or
a graph of acceleration versus time of the at least one occurrence of the application of pressure to the accelerator pedal by the operator.

10. The system of claim 6, wherein the actuation module includes further instructions that when executed by the one or more processors cause the one or more processors to cause, in response to the existence of the first condition and the existence of the second condition, an actuation of an additional device disposed on the vehicle that at least one of:
provides a communication of a warning signal to an operator of the vehicle, or
prevents a communication of a signal to a throttle controller that causes the speed of the vehicle to increase.

11. The system of claim 6, wherein the one or more processors are configured to receive the sensor signal from one or more sensors, and at least one of the one or more sensors is disposed on an object separate from the vehicle.

12. The system of claim 6, wherein the memory further stores a generation module including instructions that when executed by the one or more processors cause the one or more processors to at least one of:
- generate the brake pedal usage profile, or
- generate the accelerator pedal usage profile.

13. The system of claim 12, wherein the generation module includes further instructions that when executed by the one or more processors cause the one or more processors to at least one of:
- update continually the brake pedal usage profile, or
- update continually the accelerator pedal usage profile.

14. The system of claim 6, wherein the one or more processors are further configured to at least one of:
- receive, from a source separate from the vehicle, the brake pedal usage profile, or
- receive, from the source separate from the vehicle, the accelerator pedal usage profile.

15. The system of claim 6, wherein:
- the brake pedal usage profile comprises a set of brake pedal usage profiles,
- the set of brake pedal usage profiles includes an urgent brake pedal usage profile, the urgent brake pedal usage profile being of at least one occurrence of an application of pressure to a brake pedal by an operator of the vehicle in an urgent situation, and
- the second condition is that the manner in which the accelerator pedal was set to the position is a better match to the urgent brake pedal usage profile than to the accelerator pedal usage profile.

16. The system of claim 6, wherein:
at least one of:
- the brake pedal usage profile comprises a set of brake pedal usage profiles, the set of brake pedal usage profiles including a first brake pedal usage profile associated with a first scenario and a second brake pedal usage profile associated with a second scenario, or
- the accelerator pedal usage profile comprises a set of accelerator pedal usage profiles, the set of accelerator pedal usage profiles including a first accelerator pedal usage profile associated with a third scenario and a second accelerator pedal usage profile associated with a fourth scenario, and the second condition is that the manner in which the accelerator pedal was set to the position is a better match to a brake pedal usage profile of the set of brake pedal usage profiles than to an accelerator pedal usage profile of the set of accelerator pedal usage profiles.

17. The system of claim 6, wherein:
- the brake pedal usage profile comprises a set of brake pedal usage profiles, the set of brake pedal usage profiles including a first brake pedal usage profile associated with a first operator of the vehicle and a second brake usage profile associated with a second operator of the vehicle,
- the accelerator pedal usage profile comprises a set of accelerator pedal usage profiles, the set of accelerator pedal usage profiles including a first accelerator pedal usage profile associated with the first operator and a second accelerator usage profile associated with the second operator,
- the memory further stores an identification module including instructions that when executed by the one or more processors cause the one or more processors to determine that a current operator of the vehicle is the first operator, and
- the second condition is that the manner in which the accelerator pedal was set to the position is a better match to the first brake pedal usage profile than to the first accelerator pedal usage profile.

18. The system of claim 6, wherein:
- the memory further stores a risk assessment module including instructions that when executed by the one or more processors cause the one or more processors to determine, in response to the receipt of the sensor signal and the receipt of the accelerator pedal signal, a probability of a risk of a collision of the vehicle with another object,
- the actuation module includes further instructions that when executed by the one or more processors cause the one or more processors to cause:
  - the actuation of the brake, in response to a determination that the probability is high, or
  - an actuation of an additional device disposed on the vehicle, in response to a determination that the probability is low.

19. The system of claim 6, wherein:
- the determination module includes further instructions that when executed by the one or more processors cause the one or more processors to:
  - determine, based on at least one of a current location of the vehicle or a current time, a specific context of the vehicle; and
  - determine, based on the specific context of the vehicle, that a confidence level, associated with the information included in the sensor signal that indicates the possible need to cause the speed of the vehicle to be reduced, is greater than a threshold value; and
- the actuation module includes further instructions that when executed by the one or more processors cause the one or more processors to cause, in response to the confidence level being greater than the threshold value, the actuation of the brake.

20. A system for determining an action to be performed by a vehicle in response to conflicting input signals, the system comprising:
- one or more processors configured to receive a sensor signal and a brake pedal signal, the sensor signal including information that indicates a possible need to cause a speed of the vehicle to be increased, the brake pedal signal including information that indicates that a brake pedal has been set to a position to cause the speed of the vehicle to be reduced; and
- a memory communicably coupled to the one or more processors and storing:
  - a determination module including instructions that when executed by the one or more processors cause the one or more processors to:
    - determine an existence of a first condition, the first condition being that a receipt of the brake pedal signal occurred concurrently with a receipt of the sensor signal; and
    - determine an existence of a second condition, the second condition being that a manner in which the brake pedal was set to the position is a better match to a brake pedal usage profile than to an accelerator pedal usage profile; and
  - an actuation module including instructions that when executed by the one or more processors cause the one or more processors to cause, in response to the existence of the first condition and the existence of the second condition, an actuation of a device disposed on the vehicle that causes the speed of the vehicle to be increased.

\* \* \* \* \*